(12) United States Patent
Meng-Suen

(10) Patent No.: US 6,702,445 B1
(45) Date of Patent: Mar. 9, 2004

(54) IMAGE PROJECTOR FORMING SCROLLING IMAGE

(75) Inventor: Huang Meng-Suen, Kowloon (HK)

(73) Assignee: Mr. Christmas Incorporated, New York, NY (US)

( * ) Notice: Subject to any disclaimer, the term of this patent is extended or adjusted under 35 U.S.C. 154(b) by 30 days.

(21) Appl. No.: 09/935,602

(22) Filed: Aug. 24, 2001

(51) Int. Cl.[7] ............... G03B 21/22; G03B 21/00; G03B 21/26; G03B 3/00
(52) U.S. Cl. ............... 353/76; 353/62; 353/28; 352/140; 352/129
(58) Field of Search ............... 353/46, 47, 50, 353/11, 26, 28, 68, 76; 352/140, 129

(56) References Cited

U.S. PATENT DOCUMENTS

| | | | | |
|---|---|---|---|---|
| 1,885,841 A | * | 11/1932 | Krupnik | 353/46 |
| 2,811,892 A | * | 11/1957 | Holloway | 353/45 |
| 3,897,144 A | * | 7/1975 | Hicks | 353/11 |
| 4,902,117 A | * | 2/1990 | Papp | 353/28 |
| 5,374,969 A | * | 12/1994 | Kyhl et al. | 353/119 |
| 6,481,853 B2 | * | 11/2002 | Meng-Suen | 353/35 |

* cited by examiner

*Primary Examiner*—Russell Adams
*Assistant Examiner*—Andrew Sever
(74) *Attorney, Agent, or Firm*—Fitzpatrick, Cella, Harper & Scinto

(57) ABSTRACT

An image projector includes a film assembly, motor, light source and lens. The film assembly includes a periscope having a first aperture, the film assembly being configured so as to mount a film to scroll in front of the first aperture of the periscope. The motor scrolls the film in front of the first aperture. The light source projects light through the periscope and portions of the film positioned in front of the first aperture of the periscope. The lens focuses the light projected through the film and the periscope.

14 Claims, 7 Drawing Sheets

IMAGE PROJECTOR FORMING SCROLLING IMAGE

FIELD OF THE INVENTION

The present invention relates to image projectors. More particularly, the present invention relates to image projectors for projecting images from films mounted therein that scroll across a light path to form scrolling images.

BACKGROUND OF THE INVENTION

There are available on the market image projectors for projecting commercially prepared images on a building, home or other structure, usually for decorative purposes. Typically, such projectors are used to project images with messages such as "Happy Thanksgiving" or "Merry Christmas," along with complimentary designs. The images are usually projected using any one of numerous commercially available films, slides or other such transparencies, which are mounted in the projector and can be replaced to project different images (i.e., for different holidays or seasons).

Such commercially available projectors typically include a housing containing a lamp, a film holder (which mounts a single slide/transparency), and a lens. These elements are arranged inside the housing such that the lamp projects light through the film and lens, and then out of the housing to be projected on a target surface. Typically, the lens and film holder are arranged such that a user may adjust the distance along the light path between the film and lens. This allows a user to focus the projected image.

Most commonly, these projectors are mounted on a ground stake placed in a user's yard. The side of the housing is pivotally attached to a post that is secured to the ground stake so as to provide an axis of rotation parallel with the ground. Thus, when the post is secured to the ground stake, the housing may be pivoted to change the elevation of the projected image on the home or other structure.

However, the known projectors described above have drawbacks. For example, by mounting a single slide in a conventional projector, a stationary image is projected. Therefore, only the color and design may be used to draw attention to the projected image.

The present invention is directed to an improved image projector that mounts a film which is moved/scrolled across the light path during projection to project a moving/scrolling image. Preferably, the image is scrolled parallel to the ground (horizontally) when projected so as to show a parade of images that moves across the projection area in time with the scrolling of the film. Most preferably, a continuous film (i.e., a loop-shaped transparency or a length of film attached at its free ends, which can be continuously scrolled across a light path) is provided in the projector so that the images are continually scrolled across the light path to repeat constantly the projected scene.

SUMMARY OF THE INVENTION

It is an object of the present invention to provide an image projector that projects a scrolling image.

It is also an object of the present invention to provide an image projector including an assembly for mounting a film to be scrolled across the light path so as to create a scrolling projected image.

According to a first aspect of the present invention, an image projector includes a film assembly having a periscope with a first aperture. The film assembly is configured so as to mount a film to scroll in front of the first aperture of the periscope. A motor scrolls the film in front of the first aperture as a light source projects light through the periscope and portions of the film positioned in front of the first aperture of the periscope. A lens focuses the light projected through the film and the periscope.

According to another aspect of the present invention, an image projector includes a film assembly having a periscope and a plurality of rollers rotatably mounted in the film assembly. The plurality of rollers mount a continuous film (i.e., a loop-shaped slide) by pulling the film taut about the plurality of rollers. The rollers mount the film so as to scroll about the periscope such that portions of the film pass in front of an aperture of the periscope. A motor rotates at least one of the rollers so as to cause the film to scroll around the periscope. A light source projects light through the portions of the film positioned in front of the aperture, as the film scrolls past the aperture and across the light path, and through the periscope. A lens focuses the light projected through the film and the periscope.

According to yet another aspect of the present invention, an image projector includes mounting means, scrolling means, light projecting means, light path shifting means, and focusing means. The mounting means is for mounting a film. The scrolling means is for scrolling the film mounted on the mounting means. The light projecting means is for projecting light through portions of the film mounted on the mounting means as those portions scroll across the light path. The light path shifting means is for shifting the light path of the light projected by the light projecting means before or after the light has been projected through the portions of the scrolling film. The focusing means is for focusing the light projected through the scrolling film by the light projecting means and shifted by the light path shifting means, so as to project a scrolling image formed by a pattern on the scrolling film.

The above features of the image projector of the present invention may be configured in any number of ways while keeping within the intended scope of the invention. A preferred configuration is shown in the drawings and described in detail below.

DETAILED DESCRIPTION OF THE INVENTION

Figure 4:
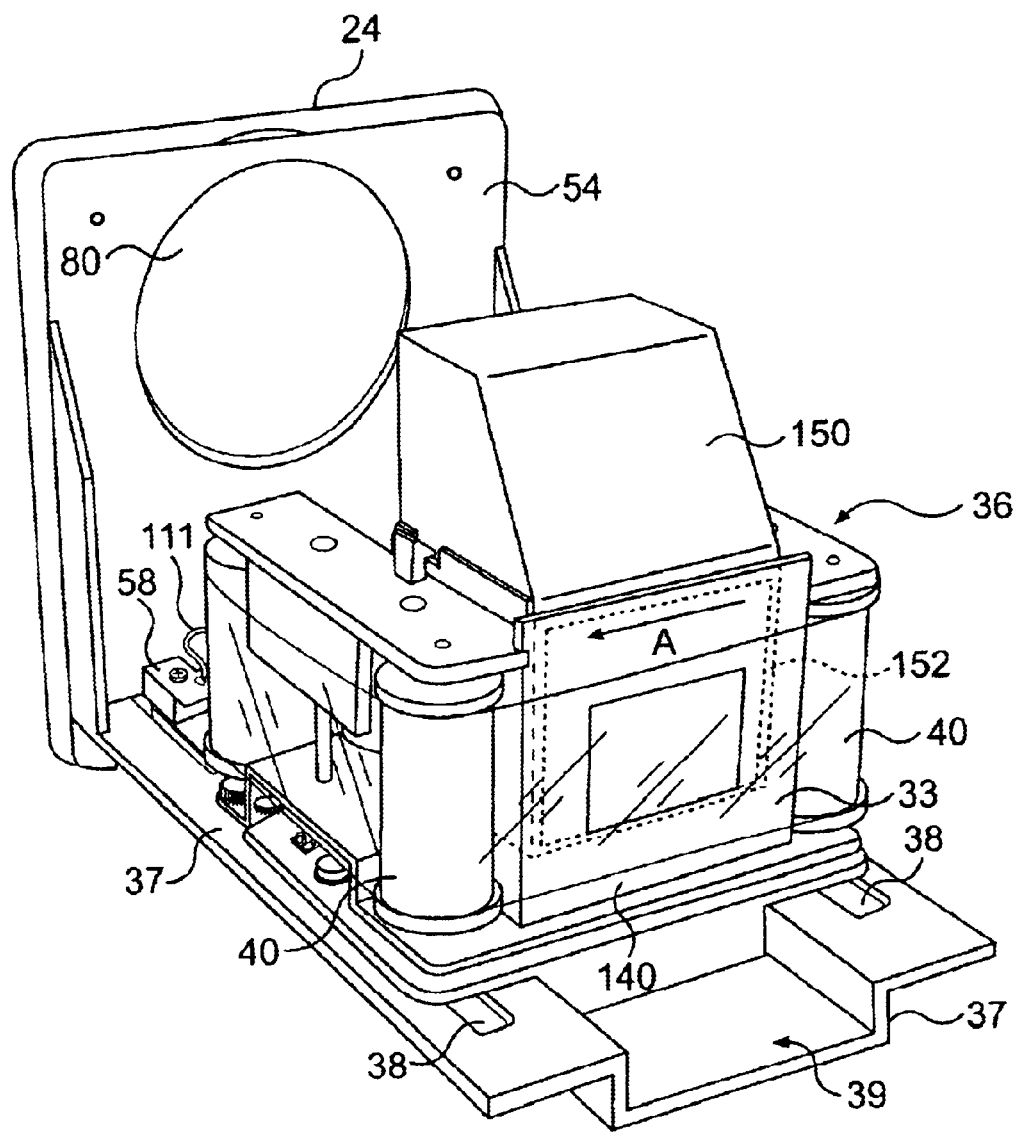
FIG. 4 is a perspective view of the mechanisms shown in FIG. 3.

In general, the present invention is directed to an image projector 10 that projects a scrolling image. This is accomplished by mounting in the image projector 10 a film or elongated slide, preferably a continuous loop-shaped transparency, having images formed thereon (for example, film 33, as shown in FIG. 4). While light is projected through the film to create the target image, the film is scrolled across the light path so that the image scrolls across the projection area.

The features of the image projector used to accomplish the present invention, as set forth above, may be configured in any number of ways. The following description sets forth, for one embodiment, preferred arrangements and configurations of the elements of the image projector 10, such as a light source 78 for projecting light, a film assembly 36 for holding the film while light is projected therethrough, a motor 46 for moving the film, a periscope 150 for shifting the light path, and a lens 80 for focusing the target images. Of course, other designs or arrangements may be used to accomplish the present invention and the following suggestions should not be viewed as limiting.

Figure 2:
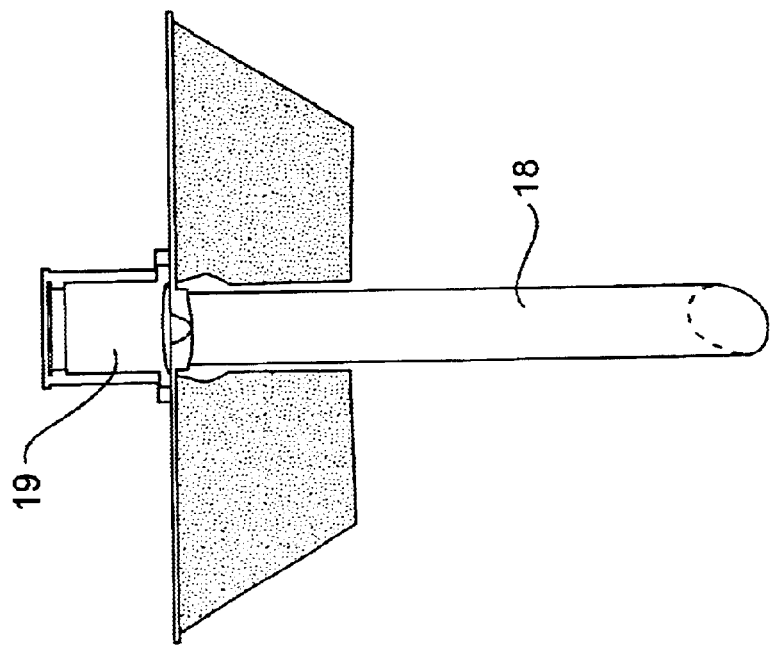
FIG. 2 is an elevational view of a ground stake for use with one embodiment of the present invention.
Figure 1:
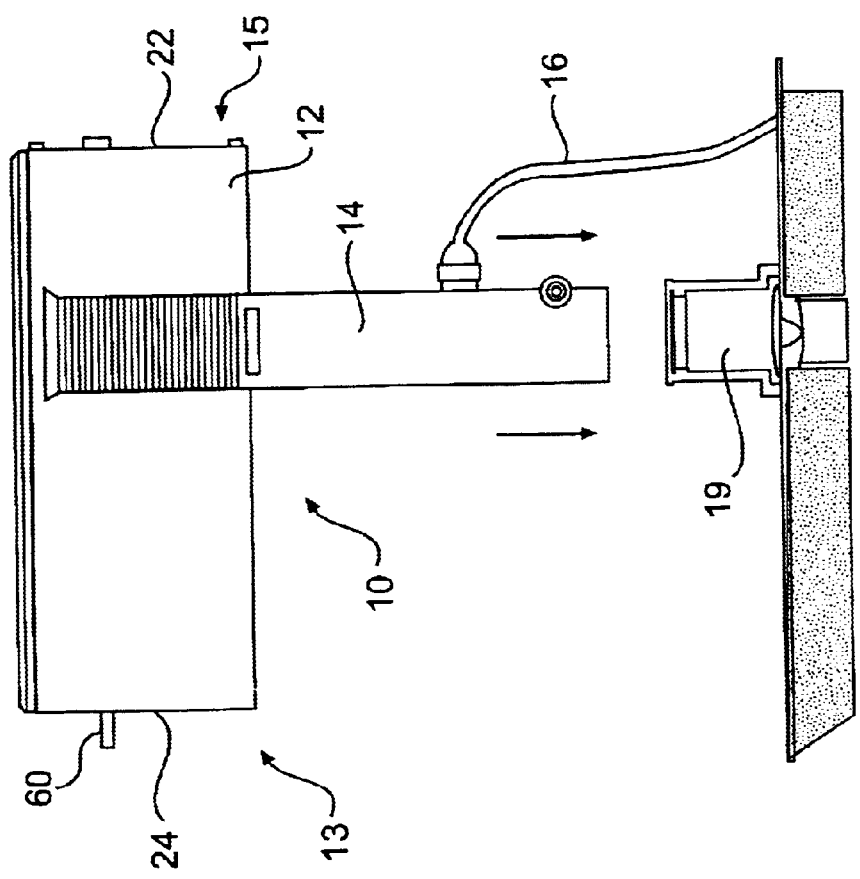
FIG. 1 is an elevational side view of one embodiment of the present invention.

As shown in FIG. 1, the image projector 10 includes a housing 12 having a front opening 13 and a back opening 15. An arm 14 is pivotally attached to one side of the housing 12. The arm 14 is detachably secured to, and supported by, a ground stake 18. Accordingly, the housing 12 may be pivoted on the arm 14 (with the axis of rotation of the pivot point being substantially parallel with the ground) to alter the angle of projection of the image. Of course, the use of the housing 12 is not necessary to accomplish the present invention, but is only preferred for arranging and holding the elements of the invention. In addition, the housing 12 does not have to be mounted on the arm 14, which does not have to be mounted on the ground stake 18. The image projector 10 may be free standing or mounted on another base so as to be properly positioned during projection.

In the embodiment shown in FIG. 1, the arm 14 has a square opening at a free end thereof in which a head 19 of the ground stake 18 is wedged. An opposite end of the arm 14 is attached to the housing 12 by a joint (not shown) to form the pivot point. A power cord 16 extends from the arm 14. (Although not shown, the power cord 16 extends up through a hollow portion of the arm 14 and enters the housing 12 through a passage in the joint between the arm 14 and the housing 12.) The power cord 16 is not necessary in all embodiments of the invention. For example, the image projector 10 may be battery operated.

A front wall 24 and a back wall 22 are removably secured in the openings 13 and 15, respectively, of the housing 12 by any suitable means. Typically, thumb screws are used. In addition, the front wall 24 and the back wall 22 are parallel with each other when secured to the housing 12. The front wall 24 and the back wall 22 are removable in the present embodiment so as to provide access to the light source 78 and the film assembly 36, as will be described below. However, the housing 12 may have alternative configurations as necessary to provide for simple operation and maintenance of the projector.

As discussed above, the image projector 10 of the present invention includes the light source 78. The light source 78 may be of any number of conventional designs and may be configured in the image projector in any number of ways.

Figure 5:
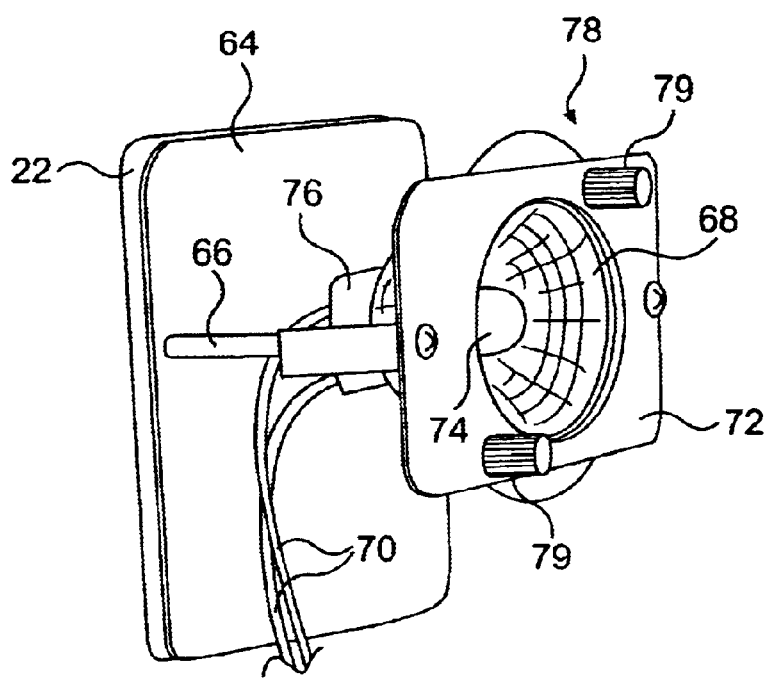
FIG. 5 is a perspective view of a portion of the internal mechanisms of one embodiment of the present invention including the light source.
Figure 6:
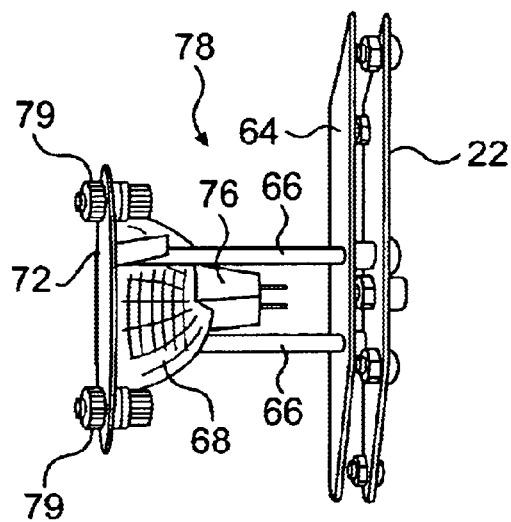
FIG. 6 is a perspective view of the mechanisms shown in FIG. 5.

In the depicted embodiment, as shown in FIGS. 5 and 6, the back wall 22 supports the light source 78 of the present invention. Thus, a user can remove the back wall 22 of the housing 12 and easily access the light source 78. Specifically, two posts 66 are secured to the back wall 22 such that they extend perpendicularly from the back wall 22 into the housing 12 when the back wall 22 is secured to the housing 12. A plate 72 is secured to opposite ends of the posts 66 that project from the back wall 22 such that it is substantially parallel with the back wall 22. The plate 72 includes a circular opening therethrough that is also substantially parallel with the back wall 22. Plate 72 mounts the light source 78 of the present invention using, for example, screws 79.

As part of the light source 78, a semi-spherical reflector 68 is secured to the plate 72 on a surface thereof facing the back wall 22. The concave reflecting surface of the semi-spherical reflector 68 faces the opening in plate 72. In addition, a bulb 74 is positioned in the concavity of the semi-spherical reflector 68. The base of the bulb 74 is positioned in the base of the semi-spherical reflector 68 such that it is electrically connected to a socket 76, which is secured to the convex portion of the semi-spherical reflector 68.

Wires 70 extend from the socket 76 through the power cord 16 (shown in FIG. 1) so as to provide an electrical connection between the bulb 74 and a power source when the power cord 16 is connected to the power source.

Typically, a fifty watt or smaller bulb provides the necessary light for projecting the image. However, the wattage and bulb type (i.e., fluorescent, halogen, etc.) may be chosen for particular applications.

In addition, other conventional means of creating and projecting light may be used for the light source 78. In particular, the configuration and shape of the semi-spherical reflector 68 may be varied or removed from the invention. Also, the light source 78 may be mounted in the projector system in any number of other ways.

The back wall 22 is secured to the housing 12 by thumb screws (not shown) that thread in through a side of the housing 12. A securing plate 64, shown in FIG. 6, is situated between the back wall 22 and the plate 72, and is secured to the posts 66. Consequently, the securing plate 64 is positioned within the housing 12 when the back wall 22 is mounted thereon. When fully assembled, the thumb screws are secured in the side of housing 12 (shown in FIG. 1) to extend in a direction substantially perpendicular to the lengths of posts 66 such that the tips of the thumb screws are positioned between the back wall 22 and the securing plate 64. Accordingly, the thumb screws restrict the movement of the back wall 22 and the securing plate 64 to secure the back wall 22 in the opening 15. Alternatively, the back wall 22 may be connected to the housing 12 by other configurations. Also, the light source 78 may be accessed by structures other than the removable back wall 22.

Also in this embodiment, as shown in FIG. 4, the front wall 24 supports and secures the film assembly 36 and the lens 80 of the present invention.

The front wall 24 has a circular opening extending therethrough, exposing the inside of the housing 12 when mounted. The lens 80 is secured to the front wall 24 so as to be exposed in the opening through the front wall 24. Preferably, a plate 54, with a hole therethrough, is secured to the front wall 24 so as to clamp the lens 80 therebetween. Thus assembled, light exiting the housing 12 through the aligned holes in the front wall 24 and the plate 54 passes though the lens 80. Thus situated, the lens 80 may be used to focus the target image.

However, any number of configurations may be used to mount the lens 80 in the image projector 10. In particular, so that focusing may be achieved, the lens 80 may be arranged so as to be movable along the light path of the image projector 10 to focus the image. Alternatively, the image projector 10 may be configured such that the film 33 is movable with respect to the lens 80. Such arrangements are discussed in more detail below.

Conventional lenses of a wide variety of designs and powers may be used depending on the particular projector and intended use.

As shown in FIG. 1, when mounted, the front wall 24 preferably is secured to the housing 12 by a thumb screw (not shown). The thumb screw is screwed into the side of the housing 12 such that the tip of the screw 115 is positioned between the front wall 24 and the plate 54 (as shown in FIG. 4). Similarly to the thumb screw used to secure the back wall 22, this thumb screw restricts the movement of the combined structures of the front wall 24 and the plate 54 in directions parallel to the light path. However, other configurations may be used to secure the front wall 24 to the housing 12. Alternatively, the workings of the image projector 10 may be accessed by structures other than the removable front wall 24. Consequently, the plate 54 is not necessary in all embodiments of the present invention, and the design of the image projector may be varied to include structures other than the plate 54.

Figure 9:
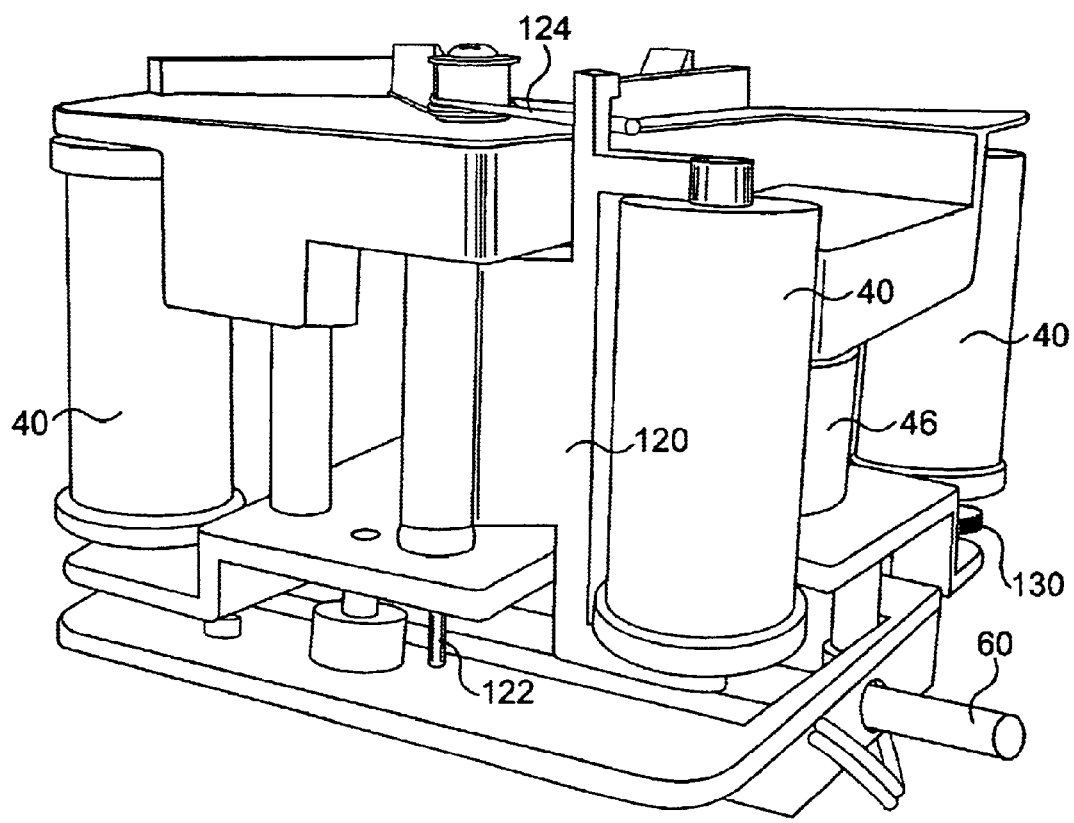
FIG. 9 is a perspective view of the opposite side of the internal mechanisms shown in FIG. 4.

The front wall 24 and plate 54 also provide guidance and support for a post 60. As shown in FIG. 9, the post 60 extends through the plate 54 and the front wall 24 (through hole 61, shown in FIG. 3) at a position outside of the aligned openings therethrough (discussed above) as viewed in a direction of the light path. Also, the post 60 is positioned through the front wall 24 and the plate 54 such that the post 60 is substantially perpendicular to the plate 54 and the front wall 24, that is, the post 60 extends in the direction of the light path. Thus assembled, the post 60 slidingly engages the plate 54 and the front wall 24 so that the post 60 slides through the plate 54 and the front wall 24 along a path substantially parallel with the light path.

As shown in FIG. 1, a free end of the post 60 projects through the hole 61 in the front wall 24 and is positioned outside of the housing 12. To prevent the free end of the post 60 from sliding completely into the housing 12 through the front wall 24, the other free end of the post 60 is secured to the film assembly 36. The post may be secured to the film assembly 36 by any conventional means. In the present embodiment, the post 60 extends through a hole in the film assembly 36 and screws (not shown) are positioned in the post 60 on both sides of the hole so as to prevent the sliding of the post 60 through the hole passed the restricting screws along the length thereof. Thus configured, moving the free end of the post 60 positioned outside the housing 12 adjusts the position of the film assembly 36 in the housing 12, as is discussed in more detail below. Of course, the post 60 may be secured to the film assembly 36 by numerous other conventional means.

As shown in FIG. 4, rigidly secured to the plate 54 is a support 37, which extends away from the plate 54 so as to be substantially parallel to the light path and substantially perpendicular to plate 54. When the front wall 24 is mounted on the housing 12, the support 37 extends into the housing 12. Preferably, the support 37 includes a pair of slots 38, which define openings through the support 37 and extend in directions substantially perpendicular to plate 54. On the upper face of the support 37 there is formed a track 39, which is positioned between the slots 38 and extends in directions substantially parallel thereto.

The film assembly 36 rests in the track 39 so as to be slideable therein in directions substantially perpendicular to the front wall 24 and the plate 54, and substantially parallel to the light path and slots 38. Preferably, screws (not shown) are provided with the film assembly 36, the shafts of which extend through the slots 38 and are screwed into the bottom of the film assembly 36. The heads of the screws are wide enough that they cannot pass though the slots 38. The screws may be tightened such that the film assembly 36 is secured on the support 37 in the track 39, but so that the shafts of the screws are movable along the slots 38. Thus, the film assembly 36 can move along the track 39 as the shafts of the screws move along the slots 38.

Thus configured, the free ends of the post 60 may be moved in and out of the housing by a user to adjust the position of the film assembly 36 along the track 39. Because the film assembly 36 mounts the film 33, the movement thereof adjusts the distance between the film 33 and the lens 80. This movement in turn provides for the focusing of the projected image. Of course, other methods may be used to perform focusing, and the depicted embodiment just provides one example. In other embodiments, for instance, the lens 80 may be movable with respect to the film assembly 36 and the housing 12.

The film assembly 36 secures the film 33 so that light from the light source 78 is projected through the film 33 and lens 80 to create a projected image. The film 33 is preferably a transparent loop-shaped film (or a length of film having its ends secured to each other) with images formed thereon, having a width in the range of 0.75–2.0 in.

Thus formed, the loop may be continuously scrolled across the light path, in direction A as shown in FIG. 4, to project a moving image that also scrolls continuously across the projection area in time with the movement of the film. An image on the film 33 is projected onto the projection area when the portion of the film 33 containing that image is scrolled across the light path. During that time, the projected image moves across the projection area and is visible to a viewer. Once the portion of the film 33 containing that image moves out of the light path, the user cannot see the image until the loop completes a full rotation and that section of film 33 is again positioned in the light path. Accordingly, the images on the film 33 are continuously scrolled across the projection area at a predetermined speed so that users can view the images as they scroll. Most preferably, the film 33 and, consequently, the projected images scroll horizontally (i.e., substantially parallel to the ground).

In other embodiments, the film 33 does not have to scroll horizontally. Also, the film 33 does not have to be formed in a loop shape, and instead the free ends of the film may be secured to on separate rotating reels or the like.

Figure 3:
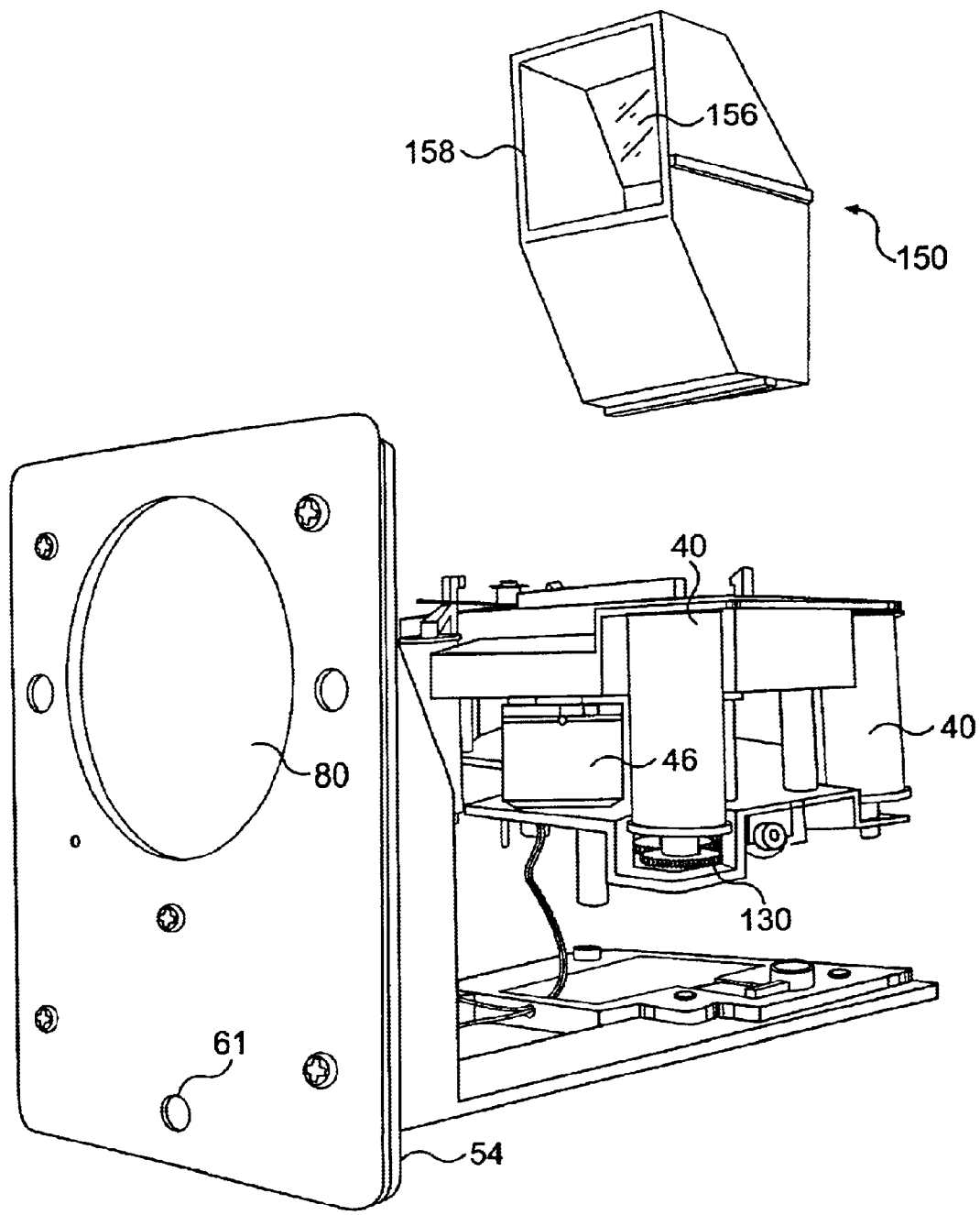
FIG. 3 is a partially exploded view of a portion of the internal mechanisms of one embodiment of the present invention including the film assembly.

In embodiments where the film 33 is loop shaped, it is preferable that the film be mounted about a number of rollers 40 (i.e., posts or spools) secured in the film assembly 36, as shown in FIG. 3. It is preferred that the rollers 40 are pivotably mounted in the film assembly 36 so as to rotate with the film 33. More specifically, in the depicted embodiment, as shown in FIG. 9, four rollers 40 are pivotably mounted in the film assembly 36 so as to rotate about axes substantially parallel with each other and substantially perpendicular to the light path In the present embodiment, the axes are defined by pins (not shown) secured in the film assembly 36, on which the rollers 40 are mounted. The direction of rotation of the rollers 40 is shown by arrow B in FIG. 9.

Preferably, and as shown in the present embodiment, the rollers 40 are spaced throughout the film assembly 36 such that film 33, when mounted about the rollers 40, and viewed from above, defines a generally square shape. Of course, other configurations may be used. It is preferable that the rollers 40 be spaced such that the film 33 may be mounted around the rollers 40 so as to be removably secured thereon. Lips or other projections may be provided at the bases of the rollers 40 to support the film 33 mounted thereon.

Figure 8:
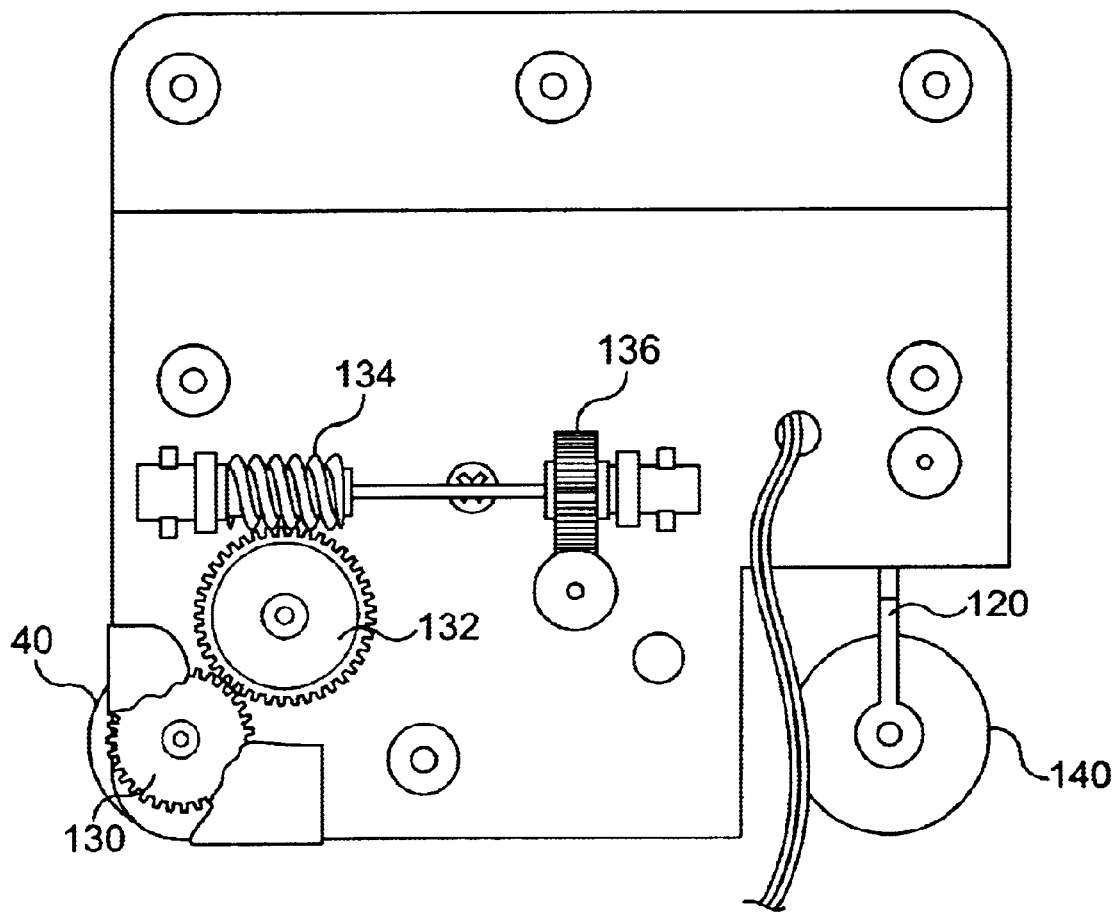
FIG. 8 is a bottom view of structures shown in FIG. 3.

In the present embodiment, as shown in FIGS. 8 and 9, one of the rollers 40 is mounted on an arm 120, which holds the pin on which that roller 40 is mounted. The arm 120 is mounted on a support shaft 122, which is parallel to the axes of rotation of rollers 40. Accordingly, the arm 120 is rotatable about the support shaft 122 so as to allow the roller 40 mounted on the arm 120 to pivot about the support shaft in directions shown by arrow C, substantially perpendicular to axis of rotation of that roller 40.

Also as shown in FIG. 9, the film assembly includes a biasing spring 124. Any one of a number of conventional springs may be used for the biasing spring 124. In the present embodiment, the biasing spring 124 is a twisted wire wrapped around a screw on the top of the film assembly 36. One end (not shown) of the biasing spring 124 abuts against the film assembly 36. The other end of the biasing spring 124 abuts a portion of the arm 120. The tension in the biasing spring 124 generates a force between the film assembly 36 and arm 120. This force causes the arm 120 to pivot about its axis as it is repelled from the film assembly 36. The biasing spring 124 is positioned such that the roller 40 mounted on the arm 120 is moved away from the other rollers 40 (i.e., outward, away from the center of the film assembly 36) as the arm 120 is pivoted by the biasing force of the biasing spring 124.

Accordingly, a user may push the arm 120 toward the film assembly 36 when loading the film 33. Once the film 33 is loaded so as to wrap around the four rollers 40, the arm 120 may be released. Once released, the arm 120 and the roller 40 mounted thereon swing outward, away from the film assembly 36 and against the film 33. This causes the film 33 to be pulled taut around the four rollers 40 so as to be securely mounted thereon, with the images on the film being in planes substantially parallel with the axes of rotation of the rollers 40.

In the present embodiment, another of the rollers 40 is connected to a gear train including a pinion 130, as shown in FIG. 8. Specifically, the pinion 130 is secured to the bottom of one of the rollers 40. The pinion 130 is concentric with the axis of rotation of that roller 40. The teeth of the pinion 130 engage the teeth of a gear wheel 132, which in turn engages a threaded shaft 134. Secured at an end of the threaded shaft 134, opposite to where the gear wheel engages the threaded shaft 134, is a shaft gear wheel 136. The shaft gear wheel 136 is concentric with the threaded shaft 134. The teeth of the shaft gear wheel 136 engage a motor shaft (not shown), which is also threaded.

The motor 46 operates to turn the motor shaft, which in turn causes the shaft gear wheel 136 to rotate. The rotation of the shaft gear wheel 136 causes the threaded shaft 134 to rotate, which in turn engages the teeth of the gear wheel 132 so as to cause it to rotate. The rotation of the gear wheel 132 causes the pinion 130 to rotate, thus rotating the roller 40 connected thereto.

Accordingly, the motor ultimately operates to rotate one of the rollers 40. Of course, the use of the above-described gear train is just one example of the mechanisms that may be used to rotate one or more of the rollers 40. Any one of a number of other known mechanisms may be employed to accomplish the task.

The rotation of one or more of the rollers 40, one in this embodiment, causes the film 33 to move in the direction of rotation. As the film 33 is moved by the force of rotation of the one roller 40, the other rollers 40 also rotates about their axes due to the movement of the film 33. Thus, once the motor 46 is activated, the film 33 rotates about the rollers 40 in directions substantially perpendicular to the axes of rotation of the rollers 40.

In other embodiments, the film 33 may be caused to move in this fashion by other mechanisms. For instance, slots may be provided directly in the film such that a gear wheel may engage the film 33 directly and cause it to move about the rollers 40. In yet other embodiments, the rollers 40 do not have to rotate at-all, but may act simply as posts about which the film may be moved. Of course, in such an embodiment, the coefficient of friction between the film 33 and rollers 40 would have to be low, so that the film does not jam.

However, in each embodiment, the film 33 will be scrolled across the light path so that the images on the film 33 may be projected on the projection area.

In the present embodiment, the film 33 is scrolled around the rollers 40 such that the film moves across a frame 140, shown in FIG. 4. The frame 140 defines an opening through which the light from the light source 78 is projected. The frame 140 may control the amount of light in the light path, thus acting as an optical stop. The images on the film 33 which pass across the light path and across the opening of the frame 140 are projected passed the frame 140, and ultimately form the projected image. Although the frame 140 is not necessary for the present invention, it is preferable to control the boundaries of the projected image.

Once the light projected from the light source 78 has passed through the film 33 and the opening in the frame 140, the light enters the first aperture 152 of a periscope 150, as shown in FIGS. 3 and 4. The periscope 150 includes the first aperture 152, a first mirror (not shown), a second mirror 156, and a second aperture 158, all of which lie in the light path. After entering the first aperture 152, the light is reflected by the first mirror to the second mirror 156. The second mirror 156 reflects the light through the second aperture 158, out of the periscope 150.

Thus, the periscope 150 shifts the light path so as to continue through lens 80 at a position above the film assembly 36. Otherwise, the light path would continue through the film assembly 36 and eventually pass though the opposite side of the film 33. This would superimpose two separate images. Accordingly, to prevent the obstruction that is caused by the film 33 when a loop of film is used, the periscope shifts the light path to avoid portions of the film 33 and the rest of the film assembly 36.

In the present embodiment, the light path prior to entering the periscope 150 is substantially parallel to the light path after exiting the periscope 150. However, a number of variation are possible to this arrangement, while still keeping with the intended scope of the present invention.

In that regard, the periscope 150 does not have to be enclosed and is not limited to the apertures and mirror described above. Instead, the periscope 150 is intended to be a means for shifting the light path. Other arrangements of reflecting surfaces may be used as the periscope 150. The positioning and angling of the reflecting surfaces will vary among different embodiments and may be adjusted to direct the light path as necessary.

In addition, in other embodiments, the order of the periscope 150, film 33, and frame 140 along the light path may be varied. For instance, the order may be reversed so that the light passes thought the periscope 150 before passing through the film 33.

In the present embodiment, the light exiting the second aperture 158 has a clear path to the lens 80, through which it passes to exit the housing 12 to be projected toward the target surface.

Thus, in the present embodiment, light is projected from light source 78 out of the semi-spherical reflector 68 toward the film assembly 36, with the semi-spherical reflector 68 being substantially aligned with the frame 140. The light passes through the film 33 as the film 33 is scrolled horizontally about the rollers 40 by the action of the motor 46. The light then passes through the frame 140, which defines the shape of the projected beam (and thus the projected image), before entering the periscope 150 through the first aperture 152. After the light beam is shifted by the first and second mirrors, it exits the periscope 150 through the second aperture 158. The light beam then passes through the lens 80, with the distance between the lens 80 and the film 33 in the film path being variable with the movement of the film assembly 36 along the track 39. The lens 80 focuses the light beam so as to be projected on a target surface to form the images from the film 33. The formed target images scroll across the target area as the film 33 is moved by the motor 46. The images may be focused by sliding the post 60 in and out of the housing 12 to vary the distance between the film assembly 36 and the lens 80.

Of course, this is only one embodiment for projecting the scrolling image. Other designs of the projector 10 are possible, as generally discussed above.

Figure 7:
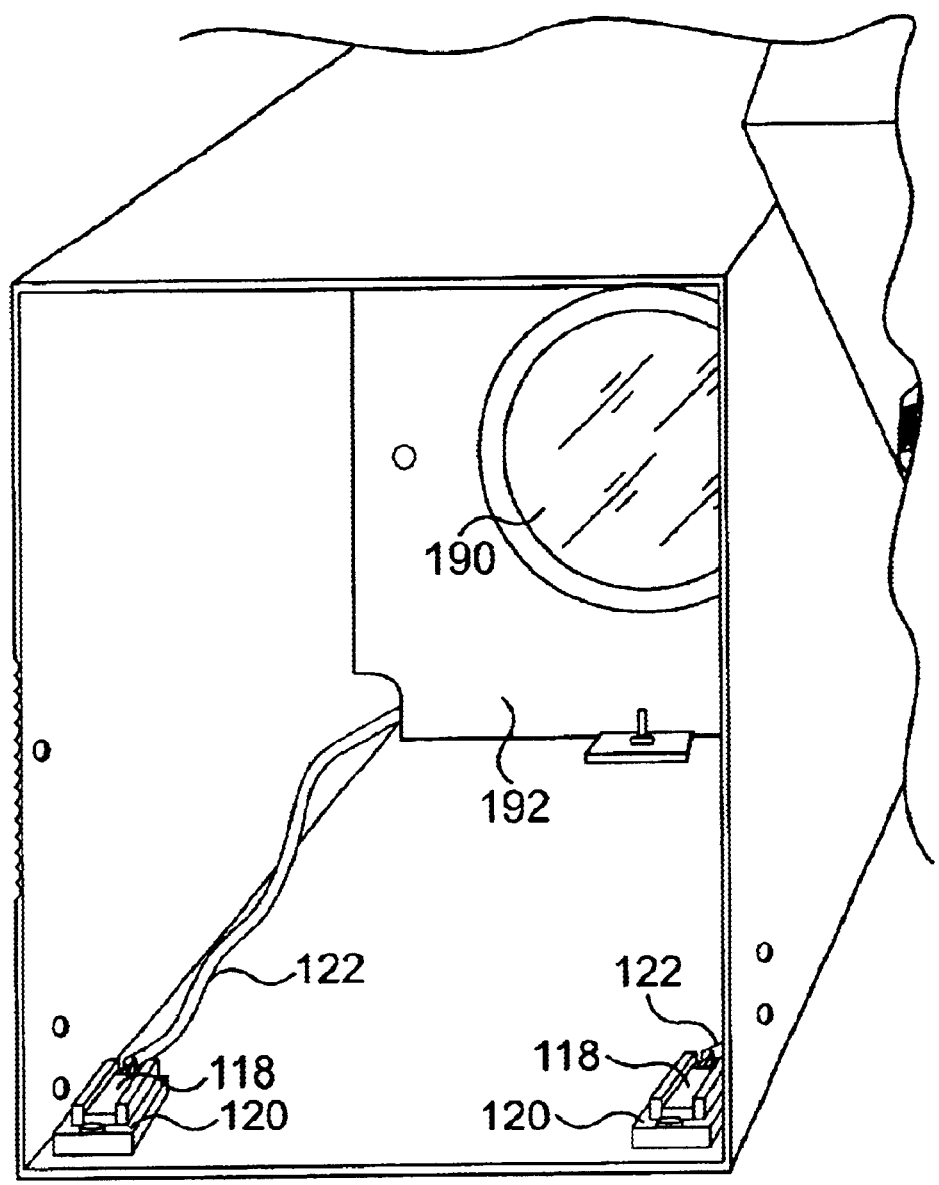
FIG. 7 is a perspective view of a housing of one embodiment of the present invention.

The motor 46 is electrically connected by wires 111 to arcuate electrical contacts 58, one of which is partially shown in FIG. 4. The arcuate electrical contacts 58 are mounted on the support 37. The arcuate electrical contacts 58 bow downward, in a direction substantially perpendicular to the light path. As shown in FIG. 7, elongated electrical contacts 118 are mounted in respective engaging members 120, which are secured to an inside wall of the housing 12. When the front wall 24 is mounted on the housing 12, the arcuate electrical contacts 58 slidingly engage tracks formed in the corresponding engaging members 120 such that the arcuate electrical contacts 58 and the elongated electrical contacts 118 form electrical connections. Wires 122 connect the elongated electrical contacts 118 to a power supply through the power cord 16. Of course, the positions and workings of the motor and electrical connections therefor may be varied while keeping within the scope of the present invention.

In preferred embodiments, a light filter 190 (shown in FIG. 7) may be provided between the bulb 74 and the film assembly 36, such that light from the bulb 74 is filtered before reaching the films 33 and 35. The filter 190 may be combined with the light source 78 or positioned on its own within the housing 12. When positioned on its own, the filter may be mounted on a partition 192 within the housing 12, such that the partition 192 only allows light passing through the filter 190 to reach the film assembly 36. The filter 190 may be used to reduce glare that could affect the projected image, and preferably is a polarized UV filter.

While the present invention has been described above with respect to what is considered to be preferred embodiments, the invention is not limited to the disclosed embodiments. To the contrary, the invention is intended to cover various modifications and equivalent arrangements included within the spirit and scope of the appended claims. The scope of the claims is to be accorded the broadest interpretation so as to encompass all such modifications and equivalent structures and functions.

I claim:

1. An image projector, comprising:
    a film assembly comprising a periscope, having a first aperture, and a plurality of rollers on which a continuous film is to be mounted, said rollers being rotatably secured to said film assembly so as to rotate about substantially parallel axes so as to mount the film to scroll in front of said first aperture of said periscope;
    a motor, mounted on said film assembly, for scrolling the film around said periscope and in front of said first aperture;
    a light source projecting light through said periscope and portions of the film positioned in front of said first aperture of said periscope; and
    a lens for focusing the light projected through the film and said periscope;
    wherein said film assembly, with said periscope, said plurality of rollers, and said motor mounted thereon, is slidingly secured to said lens to move on a track, along the light path, such that a distance along the light path between said lens and the film mounted on said rollers is variable, and focusing of an image on the film projected by said image projector is performed by varying the distance between said lens and the film.

2. An image projector according to claim 1, wherein one of said plurality of rollers is rotated by said motor, causing the film, when mounted, to scroll about the rollers in directions substantially perpendicular to the axes of rotation of said rollers.

3. An image projector according to claim 2, wherein said film assembly comprises four rollers.

4. An image projector according to claim 2, wherein one of said rollers is pivotably mounted in said film assembly so as to swing inwardly and outwardly in directions substantially perpendicular to the axes of rotation of said rollers, and
    wherein said film assembly further comprises a biasing spring, said biasing spring biasing said pivotably mounted roller outward so as to pull the film, when mounted, taut against said plurality of rollers to secure the film on said rollers.

5. An image projector according to claim 2, further comprising a housing containing said carriage, said film assembly, said lens, said motor and said light source, with said light source and said lens being secured in said housing; and
    means for varying the position of said carriage with respect to said lens and said housing,
    wherein said carriage, supporting said film assembly, is removably secured to said housing.

6. An image projector according to claim 2, wherein said motor is mounted on said film assembly.

7. An image projector according to claim 1, wherein said periscope further comprises a first mirror, a second mirror, and a second aperture.

8. An image projector according to claim 7, wherein said light source, the film, said first aperture, said first mirror, said second mirror, said second aperture and said lens are arranged in that order along the light path.

9. An image projector according to claim 7, wherein said light source, said second aperture, said second mirror, said first mirror, said first aperture, the film and said lens are arranged in that order along the light path.

10. An image projector, comprising:
    a film assembly comprising a periscope and a plurality of rotatably mounted rollers, said plurality of rollers mounting a continuous film so as to scroll about said periscope, in directions substantially perpendicular to axes of rotation of said rollers, such that portions of the film pass in front of a first aperture of said periscope;

a motor, mounted on said film assembly, for rotating at least one of said rollers so as to cause the film to scroll around said periscope;

a light source projecting light through (i) the portions of the film positioned in front of said first aperture, as the film scrolls past said first aperture and across the light path, and (ii) through said periscope;

a lens for focusing the light projected through the film and said periscope; and a housing containing said carriage, said film assembly, said plurality of rollers, said lens, said light source, and said motor, wherein said film assembly, with said periscope, said plurality of rollers, and said motor mounted thereon, is slidingly secured to said lens to move on a track, along the light path, such that a distance along the light path between said lens and the film mounted on said film assembly is variable, and focusing of an image on the film projected by said image projector is performed by varying the distance between said lens and the film, and said film assembly is removably secured to said housing such that said film assembly may be removed from said housing to interchange films to be mounted on said plurality of rollers.

11. An image projector according to claim 10, wherein one of said rollers is pivotably mounted in said film assembly so as to swing inwardly and outwardly in directions substantially perpendicular to the axes of rotation of said rollers, and wherein said film assembly further comprises a biasing spring, said biasing spring biasing said pivotably mounted roller outward so as to pull the film, when mounted, taut against said plurality of rollers to secure the film on said rollers.

12. An image projector according to claim 10, wherein said periscope further comprises a first mirror, a second mirror, and a second aperture.

13. An image projector according to claim 12, wherein said light source, the film, said first aperture, said first mirror, said second mirror, said second aperture and said lens are arranged in that order along the light path.

14. An image projector, comprising:

mounting means for mounting a continuous film;

light projecting means for projecting light through portions of the film mounted on said mounting means;

light path shifting means for shifting the light path of the light projected by said light projecting means before or after the light has been projected through the portions of the scrolling film;

scrolling means for scrolling the continuous film mounted on said mounting means around said light path shifting means and across the light path of said light projecting means;

supporting means for supporting said mounting means, said light path shifting means, and said scrolling means;

focusing means for focusing the light projected through the scrolling film by said light projecting means and shifted by said light path shifting means, so as to project a scrolling image formed by a pattern on the scrolling film, said focusing means comprising lens slidingly secured to said supporting means and performing focusing by varying the distance between said lens and the film; and housing means for housing said mounting means, said light projecting means, said light path shifting means, said scrolling means, said supporting means, and said focusing means, wherein said supporting means is removably secured to said housing means such that said supporting means may be removed from said housing means to interchange films to be mounted on said mounting means.

* * * * *

UNITED STATES PATENT AND TRADEMARK OFFICE
CERTIFICATE OF CORRECTION

PATENT NO. : 6,702,445 B1
DATED : March 9, 2004
INVENTOR(S) : Huang Meng-Suen

It is certified that error appears in the above-identified patent and that said Letters Patent is hereby corrected as shown below:

Column 6,
Line 49, "secured to" should read -- secured --; and
Line 59, "path In" should read -- path. In --.

Column 8,
Line 4, "rotates" should read -- rotate --;
Line 45, "though" should read -- through --; and
Line 54, "variation" should read -- variations --.

Column 9,
Line 52, "films 33 and 35." should read -- film 33, --; and
Line 62, "is" should read -- are --.

Column 11,
Line 14, "said carriage" should read -- said film assembly --.

Column 12,
Line 27, "lens" should read -- a lens --.

Signed and Sealed this

Twenty-eighth Day of December, 2004

JON W. DUDAS
*Director of the United States Patent and Trademark Office*